UNITED STATES PATENT OFFICE.

JOHN F. DUKE, OF LONDON, ENGLAND.

MANUFACTURE OF MANTLES OR INCANDESCING BODIES FOR INCANDESCENT GAS-LAMPS.

SPECIFICATION forming part of Letters Patent No. 593,991, dated November 23, 1897.

Application filed July 27, 1896. Serial No. 600,690. (No specimens.)

*To all whom it may concern:*

Be it known that I, JOHN FREDERICK DUKE, of London, England, have invented certain new and useful Improvements in the Manufacture of Mantles or Incandescing Bodies for Incandescent Gas-Lamps, of which the following is a specification.

My invention has reference to the manufacture of mantles or incandescing bodies (hereinafter included in the term "mantles") for incandescent gas-lamps; and its objects are chiefly to render the mantles more durable, to increase their lighting power, and to obviate the greenish color which generally shows itself in mantles after they have been in use some time.

According to my invention I take advantage of the known physical property of barium oxid to absorb oxygen from the air at a high temperature and to give up this oxygen at a slightly-lower temperature.

For the purpose of my invention I produce upon the surface of the mantles—that is to say, upon the surface of the refractory metals of which they are composed—a coating or deposit of barium oxid. When the mantle thus coated with barium oxid is fitted to a gas-lamp in the usual manner and the gas is ignited, so that the mantle becomes incandescent, I find by experimental use that the inner side of the mantle remains at a slightly-lower temperature than the outer side, which is in contact with the atmospheric air, because the gas plays or impinges upon the inner side and tends to cool it. The result of this is, I find by experiment, that the coating of barium oxid at the outer side absorbs oxygen from the atmospheric air and, as it were, becomes a carrier of the oxygen from the atmospheric air outside the mantle to the gas that impinges upon the inside of the mantle. Consequently as the gas receives an increased supply of oxygen a higher temperature and greatly-increased light are produced, while there is no tendency for the light to acquire a greenish color in course of time.

In carrying out the preferred form of my invention I take previously-formed mantles of any suitable kind and dip the mantles, preferably when they have their usual coating of collodion, in a solution of barium salt, preferably a cold saturated solution of barium chlorid. Then when the mantles are dry I submit them to a high temperature (which may be best effected by placing them on Bunsen burners) for a sufficient length of time to drive out any acid, as hydrochloric acid, (HCl,) which may be present, and thereby reduce the barium salt to barium oxid. The heat in addition to converting the salt into oxid upon the surface of the mantle has the effect of producing a slight fusion either of the barium or of the refractory metals, so that they become sufficiently united for the barium oxid to be permanently retained. This union has the further advantage of increasing the strength of the mantles and rendering them more durable. The mantle thus formed or treated constitutes an improved article for an incandescing body having any suitable interstitial formation and composed of any suitable material coated on its outer surface with barium oxid. Old or used mantles or new and unused ones of the character now employed can be treated according to my invention, or the mantle can be originally made with the said external coating.

What I claim, and desire to secure by Letters Patent, is—

1. The process or method of treating mantles or incandescing bodies for incandescent gas-lamps, which consists in impregnating existing bodies of such character with a barium compound, and reducing such compound to barium-oxid coating on said bodies by submitting them to a high temperature, substantially as set forth.

2. The process or method of treating mantles or incandescing bodies for incandescent gas-lamps, which consists in forming a coating of barium oxid on said bodies with a barium salt, substantially as and for the purpose set forth.

3. The improved mantles or incandescing bodies for incandescent gas-lamps, consisting of bodies of refractory materials having an external surface of barium oxid, substantially as and for the purpose set forth.

4. The process or method of making mantles or incandescing bodies for incandescent gas-lamps, which consists in dipping a body of refractory metal in a solution of a barium salt, drying the dipped body, and heating it at a high temperature.

5. The improved article for mantles or incandescing bodies for incandescent gas-lamps, consisting of an interstitial body of refractory metal having an external coating of barium oxid, substantially as and for the purpose set forth.

In witness whereof I have hereunto signed my name in the presence of two subscribing witnesses.

JOHN F. DUKE.

Witnesses:
 JOHN C. MEWBURN,
 GEORGE C. BACON.